US006467013B1

(12) United States Patent
Nizar

(10) Patent No.: US 6,467,013 B1
(45) Date of Patent: Oct. 15, 2002

(54) MEMORY TRANSCEIVER TO COUPLE AN ADDITIONAL MEMORY CHANNEL TO AN EXISTING MEMORY CHANNEL

(75) Inventor: Puthiya K. Nizar, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/409,953

(22) Filed: Sep. 30, 1999

(51) Int. Cl.[7] .......................... G06F 12/00; G06F 3/00; G06F 13/00
(52) U.S. Cl. .................... 711/1; 711/5; 710/2; 710/300; 710/305
(58) Field of Search ............................. 711/1, 5; 710/2, 710/101, 107, 126, 128, 129, 300, 305

(56) References Cited

U.S. PATENT DOCUMENTS

| | | | | |
|---|---|---|---|---|
| 5,068,650 A | * | 11/1991 | Fernadez | 340/799 |
| 5,319,755 A | | 6/1994 | Farmwald et al. | 710/104 |
| 6,076,139 A | * | 6/2000 | Welker | 711/104 |
| 6,125,421 A | * | 9/2000 | Roy | 711/5 |
| 6,308,248 B1 | * | 10/2001 | Welker | 711/209 |

FOREIGN PATENT DOCUMENTS

| WO | WO-9934294 A1 | * | 12/1998 | G06F/13/18 |
|---|---|---|---|---|
| WO | WO-0142929 A1 | * | 6/2001 | G06F/12/08 |

* cited by examiner

Primary Examiner—Do Hyun Yoo
Assistant Examiner—Kimberly McLean
(74) Attorney, Agent, or Firm—Blakely, Sokoloff, Taylor & Zafman LLP

(57) ABSTRACT

A memory repeater hub comprising a main memory channel interface circuit, an expansion control channel interface circuit, and an expansion memory channel interface circuit. The main memory channel interface circuit receives a memory control packet and a memory data packet from a main memory channel. The expansion control channel interface circuit receives a first expansion control packet and a second expansion control packet from an expansion control channel. The expansion memory channel interface circuit selectively transmits the memory control packet to an expansion memory channel responsive to the first expansion control packet, and selectively transmits the memory data packet to the expansion memory channel responsive to the second expansion control packet.

18 Claims, 2 Drawing Sheets

MEMORY TRANSCEIVER TO COUPLE AN ADDITIONAL MEMORY CHANNEL TO AN EXISTING MEMORY CHANNEL

BACKGROUND

1. Field of the Invention

This invention relates to data communications in a computer system, and more specifically, to a transceiver that enables a single main memory channel to communicate with multiple expansion memory channels.

2. Background Information

Computer systems rely heavily upon Dynamic Random Access Memories ("DRAMs") to implement system memories due to their simplicity, affordability and memory density. However, it is increasingly difficult to design memory systems that satisfy the size and performance requirements for modern computer systems using DRAMs connected by conventional bus architectures. To overcome these limitations, a memory subsystem can be constructed using a memory channel architecture. Intelligent memory devices are connected by a narrow, high-speed bus, termed a channel. Packets of information are used to communicate between the memory controller and the memory devices. Direct Rambus™ architecture using Rambus® channels is an example of a memory subsystem using a memory channel architecture.

A Rambuse® channel includes a number of high-speed, controlled impedance, matched transmission lines. The length of the Rambuse® channel is limited by the electrical requirements and, as a result, the number of memory devices that can be supported by one channel is limited. The Direct Rambus™ architecture provides for a maximum of 32 Rambus DRAM (RDRAM®) devices on a Rambuse® channel with a maximum of 128 megabytes (MB) per RDRAM® and 4 gigabytes (GB) on the channel. Presently, the largest RDRAM device available is a 32 MB device reducing the capacity of a Rambus® channel to 1 GB. Some computer systems, such as systems that support large in-memory databases, have a need for very large memory subsystems made possible by 64 bit computer architectures. A computer system can be constructed with multiple Rambus® Memory Controllers (MCHs) to support more than 32 RDRAM® devices. However, the use of multiple MCHs increases system cost and complexity because of the additional logic required for the MCHs and the necessary interconnecting logic to provide a seamless memory across multiple controllers.

U.S. Pat. No. 5,319,755, assigned to Rambus Inc., discloses a multiple bus (channel) structure using transceivers that can be used when the data rate of a single bus (channel) is adequate but more memory devices are required than can be supported by a single-bus (channel). The transceivers described either repeat all signals from the memory controller to the multiple channels or, at least repeat some signals on the multiple channels that are extraneous. In a multiple memory channel structure, the repeating of extraneous signals, signals not directed to a device on a particular expansion memory channel, degrades the bandwidth of the memory subsystem. Further, there are a number of channel service request packets that must be sent by the controller to maintain the memory array. As the number of memory devices increases, the amount of bandwidth consumed by these channel service requests becomes significant. Accordingly, there is a need for a more sophisticated transceiver that recognizes signals addressed to devices on its expansion memory channel, repeating only those signals required by devices on its expansion memory channel, and that provides a mechanism to reduce the bandwidth consumed by the overhead of channel service request for the large number of devices found in a multiple memory channel configuration.

SUMMARY

A memory repeater hub comprising a main memory channel interface circuit, an expansion control channel interface circuit, and an expansion memory channel interface circuit. The main memory channel interface circuit receives a memory control packet and a memory data packet from a main memory channel. The expansion control channel interface circuit receives a first expansion control packet and a second expansion control packet from an expansion control channel. The expansion memory channel interface circuit selectively transmits the memory control packet to an expansion memory channel responsive to the first expansion control packet, and selectively transmits the memory data packet to the expansion memory channel responsive to the second expansion control packet.

DETAILED DESCRIPTION

The present invention provides a method and apparatus to connect multiple expansion memory channels to a single main memory channel through a sophisticated transceiver device, which will be termed a Memory Repeater Hub (MRH).

Figure 1:
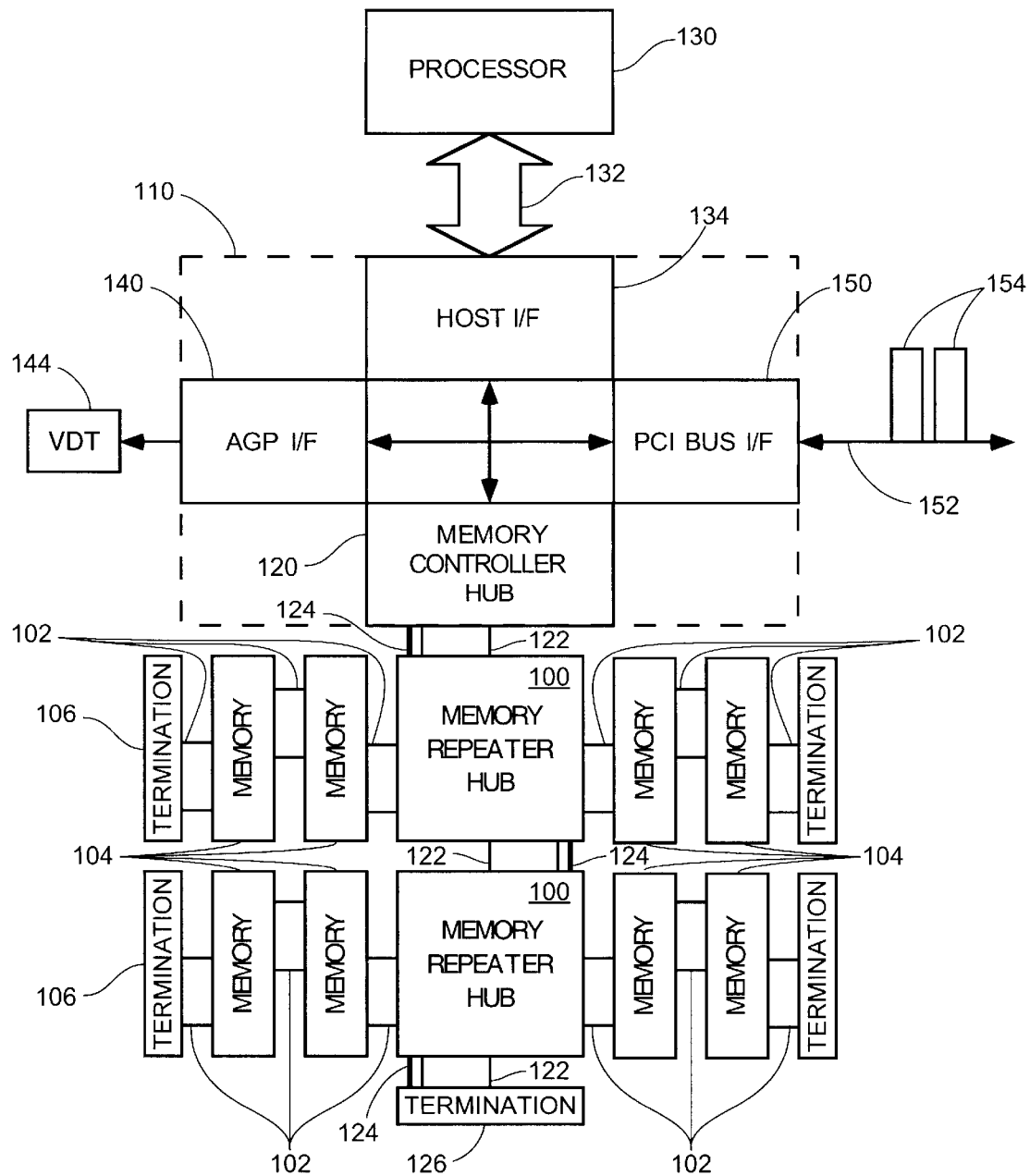
FIG. 1 is a block diagram of a computer system that includes an embodiment of a memory subsystem according to the invention.

FIG. 1 illustrates an exemplary computer system that includes an embodiment of the invention. A controller hub 110 is used to interconnect a processor 130, a video display Terminal (VDT) 144, an input/output (I/O) subsystem, and a memory subsystem. The controller hub 110 includes interconnected interface sections that provide the external connections. The processor 130 is connected to the controller hub 110 by a system bus 132 which is connected through the Host Interface 134. The VDT 144 is connected through the Accelerated Graphics Port (AGP) Interface 140. The I/O subsystem provides a Peripheral Component Interconnect (PCI) bus 152 that connects I/O devices 154 through a PCI Bus Interface 150. The memory subsystem is connected through a Memory Control Hub (MCH) 120. The interconnection of the interface sections in the controller hub 110 allows the memory subsystem to handle memory requests from the processor 130, the VDT 144, and the devices 154 on the PCI bus 152.

The MCH 120 provides a main memory channel 122 to support a memory channel architecture, such as the Direct Rambus™ architecture. Direct Rambus™ architecture provides a memory channel architecture that includes a physical channel structure, signaling levels, and a packet protocol. Direct Rambusrm architecture is further described in "Rambus® Technology Overview," DL-0040-00, Rambus Inc., Feb. 12, 1999. An exemplary main memory channel 122, as defined by the Direct Rambus™ architecture, includes 30 high-speed, controlled impedance, matched transmission lines. The high-speed signaling used on these lines is termed Rambus® Signaling Level (RSL). All RSL lines are terminated by a termination 126 with the characteristic impedance of the lines. The exemplary main memory channel 122 further includes a serial control bus with 4 low-speed lines using CMOS signaling.

Memory channels transmit control information and data as packets to allow wide data units to be transmitted over a comparatively narrow, high-speed data path. The exemplary Rambus® channel includes 30 high-speed RSL lines, which are divided into four groups. One group of 4 lines is used to transmit the channel clocking. A second group of 18 lines, the DQ lines, are used to transmit the read and write data packets. A third group of 3 lines, the ROW lines, are used to transmit row access control packets. A fourth group of 5 lines, the COL lines, are used to transmit column access control packets. To increase the speed of data communication, packet information is clocked by both the rising and falling clock edges. The row and column access control packets are both transmitted in 4 clock cycles and, therefore, contain 8 data units. A column access control packet contains 24 (3×8) bits and a row access control packet contains 40 (5×8) bits.

In a memory subsystem that embodies the invention, one or more Memory Repeater Hubs (MRHs) 100 are connected to the main memory channel 122. Each MRH provides one or more expansion memory channels 102. Each expansion memory channel 102 is functionally equivalent to the main memory channel 122 provided by the MCH 120. All of the high-speed and low-speed signal lines are provided on the expansion channels. A number of slots are provided on each expansion memory channel 102 to receive memory devices 104, such as Rambus Inline Memory Modules (RIMMs™). The memory devices 104 connected to a expansion memory channel 102 will, of course, have longer transit times to and from the MCH 120 than will devices connected directly to the main memory channel 122. In some embodiments, memory device slots are provided on the main memory channel 122. In other embodiments, memory device slots are provided only on the expansion memory channels 102.

The MCH 120 that embodies the invention further provides additional expansion control lines 124 using RSL which provide expansion control packets that allow the MCH 120 to control the MRHs 100. The expansion control lines 124 are not defined by the Direct RambusTm architecture. The expansion control lines 124 are not continued onto the expansion memory channels 102 and they are routed around any memory device slots on the main memory channel 122. The expansion control packets enable the MRHs 100 to forward to an expansion memory channel 102 only those packets that are directed to a device on the expansion channel. The expansion control packets include channel service commands that further enable the MRHs 100 to generate channel service control packets for devices on the expansion channel without consuming bandwidth on the memory channel 122 provided by the MCH 120.

Figure 2:
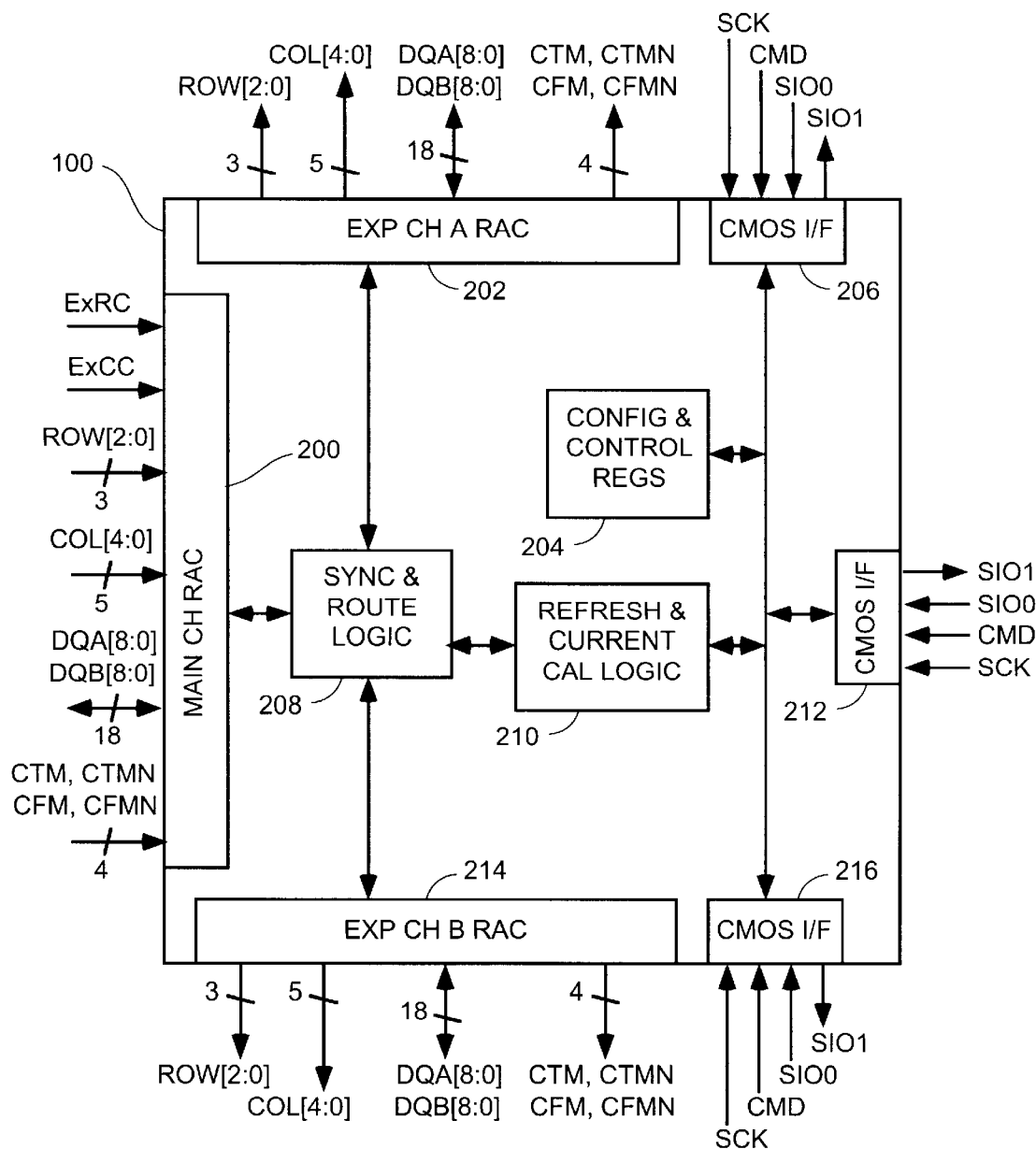
FIG. 2 is a block diagram of an embodiment of a Memory Repeater Hub.

FIG. 2 shows a block diagram for an MRH 100 that embodies the present invention. The MRH receives the high-speed RSL signals including the expansion channels ExRC and ExCC through the main channel Rambus® ASIC Cell (RAC) 200. Synchronization and routing logic 208 provides the high-speed RSL signals except for ExRC and ExCC to the expansion channel RACs 202, 214 which drive the signals onto the expansion channels 102. The low-speed signals are received through a CMOS interface 212. The low speed bus can communicate with configuration and control registers 204 and with refresh and current calibration logic 210 in the MRH 100. The low speed signals are also provided to CMOS interface logic 206, 216 that drives the signals onto the expansion channels 102.

The Expansion Channel Protocol defines the set of control and data transfer sequences that are used between the MCH 120 and an MRH 100. This protocol is designed to provide efficient use of the multiple expansion memory channels 102. The protocol includes pipelining of accesses to a selected expansion channel and between expansion channels, and sufficient control bandwidth to allow channel service operations, such as refresh, to proceed in parallel with fully pipelined memory accesses.

To achieve full bandwidth operation on the expansion memory channels 102, all control operations related to the expansion channel must be pipelined with the memory request packets. Further, independent expansion control must be allocated for the ROW and COL packets on the memory channel to maintain the variable RAS to CAS timings. This requirement results in two expansion control channels, the Expansion Row Control channel (ExRC) and the Expansion Column Control channel (ExCC).

When an MRH 100 is present in a memory subsystem, the refreshing of the RDRAMs on an expansion channel 102 is done through the MRH. The MCH 120 issues pre-charge and refresh commands to a channel through expansion control packets to the MRH. The expansion channel architecture supports the issue of broadcast pre-charge and broadcast refresh operations to a specified expansion memory channel 102 that can be carried out concurrently with memory accesses on other channels. The broadcast pre-charge operation is used to close a specified bank in all devices on a channel before and after a refresh operation.

The Digital Lock Loop (DLL) refresh of Nap devices on a channel 102 is done through the MRH 100 when present. The MCH 120 issues a Nap Exit command to an expansion channel through an expansion control packet to the MRH. The MCH then does the refresh operation on the channel for the queued up refreshes. After the refresh operations are over, the MCH puts the channel back to Nap state by issuing a Nap Entry command through another expansion control packet to the MRH.

The current calibration of devices on memory expansion channels 102 is done by the MCH 120. This operation is transparent to the MRH 100. The MRHs 100 must also be current calibrated every 100 ms. This is done by expansion control packets sent to the MRH by the MCH.

The exemplary Rambus® channel provides 30 RSL lines divided into four groups. The invention provides additional RSL lines 124 in two additional groups for control of the MRHs 100. One of the added groups is used to transmit expansion row control packets and the other group is used for expansion column control packets. One embodiment of the invention uses 1 line for an expansion row line and 1 line for an expansion column line. Each expansion packet in this embodiment is 8 bits transmitted in 4 clock cycles aligned with a corresponding row or column access control packet. This embodiment supports up to 4 memory expansion channels 102. The expansion packet protocol as implemented in this embodiment will be described below. However, it will be obvious to those skilled in the art that this protocol can be modified within the spirit of the invention to operate on a different number of lines, to be transmitted in a different number of clock cycles, to be transmitted without being aligned with another packet, or to support a different number of expansion channels.

An exemplary Expansion Row Control Packet (ExRCP) in one embodiment of the invention has the following format:

| Cycle 0 | | Cycle 1 | Cycle 2 | | Cycle 3 | |
|---|---|---|---|---|---|---|
| Start | C[0] | C[1] G | SC[0] | SC[1] | RSOP[0] | RSOP[1] |

The ExRCP of this embodiment is an 8 bit packet transmitted on the single line Expansion Row Control channel (EXRC) in 4 clock cycles. The Start bit is a framing bit for the ExRCP. C[1:0] is a two bit channel ID that selects the expansion channel 102 to receive following Row Control packets sent by the MCH 120. An ExRCP is required only when a Row Control packets is to be directed to a device on a different expansion memory channel 102. The remaining 5 bits are used to optionally generate a serial control bus command or a control packet on an expansion channel 102, which may be a different channel than the channel identified by C[1:0].

"G" is the generate flag that indicates that a control packet is to be generated on the expansion channel 102 specified by SC[1:0]. ROP[1:0] is a two bit Row Secondary Operation Code (RSOP) that indicates what type of command or control packet should be generated by the MRH 100:

| G | RSOP[1:0] | Operation |
|---|---|---|
| 0 | 00 | No RSOP. No secondary operation is being issued. The ExRCP is only being used to route ROW packets to the expansion channel selected by C[4:0]. |
| 0 | 01 | Power-down Exit. Broadcast a power-down exit command on the channel selected by SC[4:0] utilizing the serial control bus. |
| 0 | 10 | Nap Exit. Broadcast a nap exit command on the channel selected by SC[4:0] utilizing the serial control bus. |
| 0 | 11 | DLL Refresh. Broadcast a DLL refresh command to all devices in Nap on the channel selected by SC[4:0] utilizing the serial control bus. |
| 1 | 00 | Nap Entry. Broadcast a nap entry command on the channel selected by SC[4:0]. |
| 1 | 01 | Pre-charge Before/After Refresh. Broadcast a pre-charge command on the channel selected by SC[4:0]. The bank address is provided by the ExBuf. When this is issued after a refresh it caused the bank address in the ExBuf to be incremented. |
| 1 | 10 | Refresh. Broadcast a refresh command on the channel selected by SC[4:0]. The bank address is provided by the ExBuf. |
| 1 | 11 | Reserved. |

The MRH 100 includes an Expansion Buffer (ExBuf) register that maintains the refresh bank address of the RDRAM® devices on the expansion channel.

An exemplary expansion Column Control Packet (ExCCP) in this embodiment of the invention has the following format:

| Cycle 0 | | Cycle 1 | Cycle 2 | | Cycle 3 | |
|---|---|---|---|---|---|---|
| Start | C[0] | C[1] R | SC[0] | SC[1] | CSOP[0] | CSOP[1] |

The ExCCP of this embodiment is an 8 bit packet transmitted on the single line expansion Column Control channel (ExCCP) in 4 clock cycles. The Start bit is a framing bit for the ExCCP. C[1:0] is a two bit channel ID that selects the expansion channel 102 to receive following Column Control packets and D packets (write data) sent by the MCH 120. R is a redirect XOP/Byte mask flag that causes the MRH to forward the XOP/Byte mask field of the corresponding request packet to the channel identified by SC[1:0] CSOP [1:0] may be used to generate calibration commands for the MRH channel RAC identified by SC:[1:0]:

| CSOP[1:0] | Operation |
|---|---|
| 00 | No CSOP. No secondary operation is being issued. The ExCCP is only being used route COL packets and associated D, write data, packets to the expansion channel selected by C[1:0]. |
| 01 | Expansion Current Calibrate. Calibrate the current on the expansion channel for the MRH specified by SC[1:0]. |
| 10 | Reserved |
| 11 | Expansion Current Calibrate and Sample. Calibrate and sample the current on the expansion for the MRH specified by SC[1:0]. |

The MRH 100 has internal configuration and control registers 204. These registers are accessed through the low-speed interface 212. The internal registers in RDRAM® devices are also accessed through the same interface. The MRH 100 provides System Management Bus (SMBus) interface 206, 216 to read the Serial Presence Detect (SPD) ROM from the RIMM™ modules 104 located on the expansion channels 102.

Another embodiment of the invention uses 1 line for an expansion row line and 1 line for an expansion column line. Each expansion packet in this embodiment is 8 bits transmitted in 4 clock cycles aligned with a corresponding row or column access control packet. This embodiment uses an expansion packet protocol that supports up to 8 memory expansion channels 102.

An exemplary Expansion Row Control Packet (ExRCP) in this embodiment of the invention has the following format:

| Cycle 0 | | Cycle 1 | | Cycle 2 | | Cycle 3 | |
|---|---|---|---|---|---|---|---|
| C[2] | C[1] | C[0] | SC[2] | SC[1] | SC[0] | RSOP[0] | RSOP[1] |

The ExRCP of this embodiment is an 8 bit packet transmitted on the single line Expansion Row Control channel (ExRC) in 4 clock cycles. C[2:0] and SC[2:0] are three bit channel IDs. C[2:0] selects the expansion channel 102 to receive following Row Control packets sent by the MCH 120. RSOP[1:0] indicates an operation directed to the channel identified by SC[2:0]:

| RSOP[1:0] | Function |
|---|---|
| 00 | No RSOP. No secondary operation is being issued. The ExRCP is only being used to route ROW packets to the channel selected by C[2:0]. |
| 01 | Power-down/NAP Exit. Causes a broadcast power-down exit or NAP Exit command to be issued on the channel selected by SC[2:0]. The CMOS control protocol on the memory channel is used in addition to DQA bit 5 to accomplish the power-down exit. The Channel A PDN and Channel B PDN flags are used to determine whether to send a NAP exit or PDN exit command. When an expansion channel's PDN internal flag is set, the RAC and any DRCG for that channel gets powered down by the MRH as well (external DRCGs will have their |

-continued

| RSOP[1:0] | Function |
|---|---|
| | STOP# and PWRDN# signals asserted by MRH). If the PDN flag for both channels become set in the MRH, then the MRH will power-down its expansion RAC as well. To exit power-down state, the MRH must receive a RAC initialize command for its main and expansion channel RACs from the MCH. |
| 10 | Refresh. Causes a broadcast refresh to be issued on the channel selected by SC[2:0]. The bank address is provided by the MRH. |
| 11 | Precharge-Post-Refresh. The MRH will perform precharge post-refresh commands to the channel targeted by SC[2:0]. |

Conditional NAP entry is delivered via a PCP command. The MRH keeps two internal flags, Channel A PDN and Channel B PDN. When a channel receives a PDN command, the corresponding flag is set. Upon receiving the PDN/NAP exit command direct to a channel with it's flag set, a PDN exit command is generated. Otherwise a NAP exit is generated. When a channel has received a PDN command, the SIO pin for that channel will be driven to '1', preparing that channel for PDN exit. When no PDN command has been delivered, the SIO pin for that channel is driven to '0' preparing it for a NAP exit. When the MCH issues a PDN command to a channel, the MRH then asserts the SIO signal for that channel. The PDN exit command cannot be issued until sufficient time has elapsed to allow the SIO signal to propagate through all 32 RDRAM® devices.

The expansion channel architecture supports the issue of broadcast refresh and post-refresh precharge operations to a specified RDRAM channel that can be carried out concurrent with memory accesses. This allows the effective BW overhead of memory refresh to be reduced.

The MRH 100 must provide the bank addresses for broadcast refresh and post-refresh precharge operations to a specified RDRAM channel. Two separate counters are kept in the MRH. The first counter is used for refresh commands and is incremented only after a refresh command. The other counter is for precharge post refresh commands and is incremented only after a precharge post refresh command. The use of two counters allows refresh command nesting during burst refreshing schemes. The refresh bank counter skips by at least two for every count, avoiding adjacent bank interference. Second, it ensures that the REFR register inside the RDRAMs is incremented cyclically, ensuring that for each bank no rows are missed. Finally, it ensures that refresh cycles for dependent banks are kept as far apart as possible to eliminate RAS cycle time bank conflicts. The bank addresses provided by MRH must be synchronous to the bank address in the MCH. This can be achieved by resetting the bank address registers in MCH and MRH to 0 during the reset operation.

An exemplary expansion Column Control Packet (ExCCP) in this embodiment of the invention has the following format:

| Cycle 0 | | | Cycle 1 | | | Cycle 2 | Cycle 3 |
|---|---|---|---|---|---|---|---|
| C[2] | C[1] | C[0] | SC[2] | SC[1] | SC[0] | TC | CC |

The ExCCP of this embodiment is an 8 bit packet transmitted on the single line expansion Column Control channel (ExCC) in 4 clock cycles. C[2:0] is a three bit channel ID that selects the expansion channel 102 to receive following Column Control packets and D packets (write data) sent by the MCH 120. The Temperature Calibrate (TC) bit causes the MRH 100 to perform a temperature calibration of its RACs 200, 202, 214. The Current Calibrate (CC) bit causes the MRH 100 to perform current calibrate and calibrate-and-sample commands for Its RACs 200, 202, 214. TC and CC are mutually exclusive in this embodiment. SC[2:0] is a three bit channel ID that selects the MRH for TC and CC operations. Since selecting any channel on a multi-channel MRH will select the MRH, the low order bits of SC[2:0] may be don't care bits.

The internal logic of the MRH 100, including the synchronization and routing logic 208 and the refresh and current calibration logic 210, may be implemented in any form of logic, as will be readily understood by those skilled in the art. The internal logic may include, but is not limited to, combinatorial logic, state machines, programmable logic, and hybrid combinations of these types of logic and others. Programmable logic includes logic that is programmed during manufacture and logic that can be programmed by various means after the MRH is in service.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A memory repeater hub comprising:
    a main memory channel interface circuit that receives a memory control packet and a memory data packet from a main memory channel;
    an expansion control channel interface circuit that receives a first expansion control packet and a second expansion control packet from an expansion control channel, at least one of the first and second expansion control packets including a channel service command for a second expansion memory channel, the channel service command being one of a no operation command, a power-down exit command, a nap exit command, a DLL refresh command, a nap entry command, a pre-charge command, a refresh command, an expansion current calibrate command, and an expansion current calibrate and sample command; and
    an expansion memory channel interface circuit that selectively transmits the memory control packet to an expansion memory channel responsive to the first expansion control packet, and selectively transmits the memory data packet to the expansion memory channel responsive to the second expansion control packet.

2. The memory repeater hub of claim 1 wherein the first expansion control packet is one of an expansion row control packet and an expansion column control packet.

3. The memory repeater hub of claim 2 wherein the expansion row control packet selects an expansion memory channel for a corresponding memory row control packet.

4. The memory repeater hub of claim 2 wherein the expansion column control packet selects an expansion memory channel for a corresponding memory column control packet.

5. The memory repeater hub of claim 2 wherein the expansion column control packet selects an expansion memory channel for a corresponding memory data packet.

6. A memory repeater hub comprising:
    first means for receiving a first expansion control packet and a second expansion control packet from an expansion control channel, at least one of the first and second expansion control packets including a channel service command for a second expansion memory channel, the channel service command being one of a no operation command, a power-down exit command, a nap exit command, a DLL refresh command, a nap entry command, a pre-charge command, a refresh command, an expansion current calibrate command, and an expansion current calibrate and sample command;

second means for receiving a memory control packet and a memory data packet from a main memory channel; and third means for selectively transmitting the memory control packet to an expansion memory channel responsive to the first expansion control packet, and for selectively transmitting the memory data packet to the expansion memory channel responsive to the second expansion control packet.

7. The memory repeater hub of claim 6 wherein:

the first means is further for receiving an expansion row control packet, and an expansion column control packet;

the third means is further for selectively transmitting a memory row control packet responsive to the expansion row control packet and selectively transmitting a memory column control packet responsive to the expansion column control packet.

8. The memory repeater hub of claim 7 wherein the second expansion control packet is a second expansion column control packet and selectively transmitting the memory data packet further comprises selectively transmitting the memory data packet responsive to the second expansion column control packet.

9. The memory repeater hub of claim 6 further comprising fourth means for performing a channel service operation for a second expansion memory channel responsive to a channel service command in the first expansion control packet.

10. A method of providing an expansion memory channel comprising:

receiving a first expansion command packet from an expansion control channel;

receiving a memory control packet from a main memory channel;

selectively transmitting the memory control packet to the expansion memory channel responsive to the expansion control packet;

receiving a second expansion command packet from the expansion control channel;

receiving a memory data packet from a main memory channel; and selectively transmitting the memory data packet to the expansion memory channel responsive to the second expansion control packet;

wherein at least one of the first and second expansion control packets includes a channel service command for a second expansion memory channel, the channel service command being one of a no operation command, a power-down exit command, a nap exit command, a DLL refresh command, a nap entry command, a pre-charge command, a refresh command, an expansion current calibrate command, and an expansion current calibrate and sample command.

11. The method of claim 10 wherein receiving the first expansion command packet further comprises receiving one of an expansion row control packet and an expansion column control packet and selectively transmitting the memory control packet further comprises selectively transmitting a memory row control packet responsive to the expansion row control packet and selectively transmitting a memory column control packet responsive to the expansion column control packet.

12. The method of claim 11 wherein the second expansion control packet is a second expansion column control packet and selectively transmitting the memory data packet further comprises selectively transmitting the memory data packet responsive to the second expansion column control packet.

13. The method of claim 10 further comprising performing a channel service operation for a second expansion memory channel responsive to a channel service command in the first expansion command packet.

14. A memory subsystem comprising:

a memory control hub;

a main memory channel coupled to the memory control hub;

an expansion control channel coupled to the memory control hub;

an expansion memory channel;

a memory device coupled to the expansion memory channel; and a memory repeater hub coupled to the main memory channel, to the expansion control channel, and to the expansion memory channel, the memory repeater hub to receive a first expansion control packet and a second expansion control packet from the expansion control channel, at least one of the first and second expansion control packets including a channel service command for a second expansion memory channel, the channel service command being one of a no operation command, a power-down exit command, a nap exit command, a DLL refresh command, a nap entry command, a pre-charge command, a refresh command, an expansion current calibrate command, and an expansion current calibrate and sample command, to receive a memory control packet and a memory data packet from the main memory channel, and to selectively transmit the memory control packet to the expansion memory channel responsive to the first expansion control packet, and to selectively transmit the memory data packet to the expansion memory channel responsive to the second expansion control packet.

15. The memory subsystem of claim 14 wherein the first expansion control packet is one of an expansion row control packet and an expansion column control packet.

16. The memory subsystem of claim 15 wherein the memory repeater hub selectively transmits a memory row control packet to the expansion memory channel responsive to the corresponding expansion row control packet.

17. The memory subsystem of claim 15 wherein the memory repeater hub selectively transmits a memory column control packet to the expansion memory channel responsive to the corresponding expansion column control packet.

18. The memory subsystem of claim 15 wherein the memory repeater hub selectively transmits a memory data packet to the expansion memory channel responsive to the corresponding expansion column control packet.

* * * * *

UNITED STATES PATENT AND TRADEMARK OFFICE
CERTIFICATE OF CORRECTION

PATENT NO.    : 6,467,013 B1
DATED         : October 15, 2002
INVENTOR(S)   : Nizar It is certified that error appears in the above-identified patent and that said Letters Patent is hereby corrected as shown below:

Column 5,
Line 64, delete "(ExCCP)", insert -- (ExCC) --.

Column 8,
Line 6, delete "Its", insert -- its --.

Signed and Sealed this

First Day of June, 2004

JON W. DUDAS
*Acting Director of the United States Patent and Trademark Office*